Figure 1:
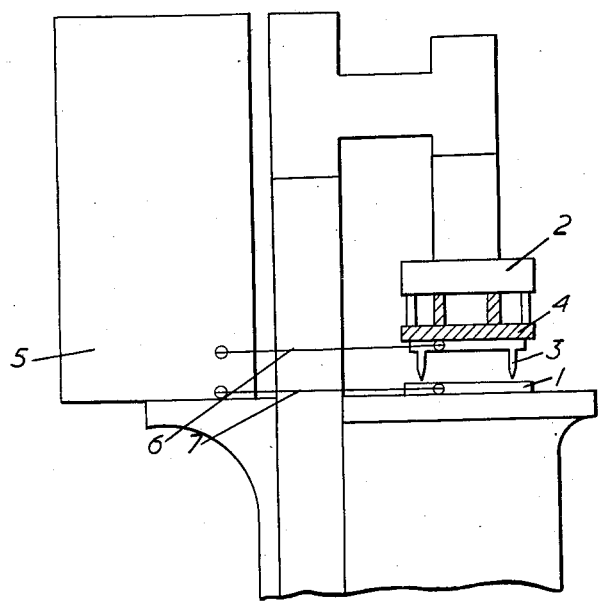

*Inventor*
Thomas B. Prew

United States Patent Office 3,099,596
Patented July 30, 1963

3,099,596
MACHINERY FOR CUTTING, EMBOSSING OR MARKING MATERIALS
Thomas Benjamin Prew, Stafford, England, assignor to Stafford Tool and Die Company Limited, a company of Great Britain
Filed Apr. 21, 1961, Ser. No. 104,746
Claims priority, application Great Britain Apr. 26, 1960
1 Claim. (Cl. 156—380)

This invention is concerned with machines and tools for heat sealing, cutting, embossing or marking thin sheet materials such as fabrics, leather, metal and various plastics for use in making various shaped goods, e.g., boot or shoe soles or uppers, gloves, wallets and cases for various purposes.

Various machines have already been proposed for this purpose. Some are satisfactory when used on some materials and not on others and no one machine at present available is suitable for heat sealing, cutting, embossing or marking all types of material including laminated products made up of superimposed layers of different materials, for instance, metal foil and p.v.c. sheeting or leather and p.v.c. Such laminated products require a hard steel cutting edge on the cutting tool if a clean cut of both materials is to be obtained. They also require sealing at the cut edges and previously this has entailed feeding the material to a separate machine, e.g., a high frequency electric heating machine because the only machines hitherto available combining such heating and cutting have been made with a relatively soft metal die, e.g., of brass or phosphor-bronze.

It is an object of the present invention to provide an improved tool for the above purposes.

According to the invention the machine comprises a press tool with work-table and die-head and a high frequency electric heating apparatus and is characterised in that the die is of a hard cutting steel and is separated from the die-head by a heat and electric current insulating material such as vulcanite, in that the work-table surface is made of material of high heat and electrical conductivity and in that the high frequency electric heating apparatus is connected to the die and work-table.

Such machines will provide the essential press die-head and work-table with the usual controls, guards and the like.

Any of the already available dies made of a hard cutting steel, may be used for the cutting embossing, marking or similar operations which the tool may be used for.

The die head is as stated above insulated from the die itself and this may be done in any convenient way using any of the well-known insulating materials capable of resisting the currents and heat involved in using the machine and robust enough to stand up to long wear.

A hard rubber such as "ebonite" or "vulcanite" or similar material is quite suitable.

An conventional high frequency electric heating apparatus can be used in the machine, the positive lead being securely connected to the die in the machine. This may be done, for instance, by a clamp so that dies may readily be changed as required and easy electrical connection quickly made.

The work table is earthed and made of or surfaced with a material such as brass which has a relatively high conductivity.

In use the material comprising for instance a sheet of thermoplastic material such as p.v.c. (polyvinyl chloride) or of a laminated material of which at least one layer is composed of such a plastic material, is located in position on the work-table, the die is lowered until it is in contact with the material to be cut and the current then switched on. There is immediate rapid local heating as the high frequency current passes from the cutting edge of the die through the material and through the brass work-table back to the generator. In a very short time the press may be used to cut clean through the material and at the same time fusion of the various laminations occurs at the cut edge. The current is switched off, the press raised and the work is removed with cutting and sealing completed in a single operation. This avoids the difficulties of exact relocation which occur when moving cut material to a heating machine for sealing, or from a heat sealing machine to a cutting machine.

If the materials used are not in themselves thermoplastic or satisfactorily sealable by heat, suitable adhesives including adhesive impregnated scrim or adhesive film may be used.

In the same way embossing, stitch marking, perforating or any similar operations can be carried out with all sorts of laminated or sheet materials, one or more of which are softened by heat.

If desired, the machine may be adapted to carry out not only cutting and heat sealing of the cut edge but also at the same time embossing or heat sealing at other parts of the work away from the cut edge. In this case the die bears in addition to the steel cutting edges through which the high frequency current flows embossing plates in the parts required.

The use of the hard steel die ensures a clean cut and long tool life, while the high frequency heating ensures rapid heating applied just and only where it is needed.

If desired, when "man-made" material such as a plastic is used, production can be speeded up and waste avoided by having the material cut into strips of the appropriate width using Standard slitting machines. The split material is formed into a roll which is placed on a stand at the side of the machine. When the operations commence the end of the roll is brought under the die either by hand or by a propriate mechanism and high frequency heating and cutting effected in the way described above. When this has been completed and the press opened, the next part of the strip is fed to the press and so on.

When leather is used as one component so that long strips are not obtainable, it is cut to a castor shape and the short lengths or castors are placed on the lining material to which it is to be sealed. Sealing is effected by heat with or without adhesive and any desired length of lining material can be used.

Figure 2:
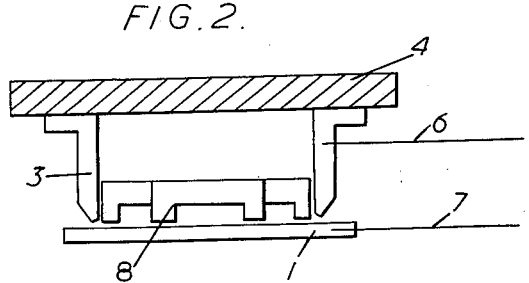

The accompanying diagrammatic drawing shows in FIGURE 1 a side view of a suitable press-machine incorporating the present invention, and in FIGURE 2 an enlarged side view of a die for both cutting and embossing.

In the drawing the work-table surface 1 is made of brass. The die-head 2 and the hard steel die 3 are separated from each other by the hard rubber insulating sheet and spacing rods 4 shown hatched. The high frequency generator 5 is connected to the die 3 and the work-table surface 1, by the cables 6 and 7 respectively.

In FIGURE 2 embossing dies 8 are also shown.

What I claim is:

The machine for the simultaneous heat sealing and cutting of laminated sheet materials, at least one of which comprises a layer of leather or like non-thermo-plastic material, another of which comprises a layer of polyvinyl chloride or like thermoplastic material, and wherein there is a thermo-plastic adhesive between the said layers, the machine comprising: a die having edges composed of a hard cutting steel to cut the material including the non-plastic layer, a press tool with work-table and a die-head to which the die is connected, a high-frequency electric heating apparatus, a heat and electric current insulating means to separate the die-head from the die, including a flat element of heat and electrical insulating against which the die is mounted, and spacing rods arranged between the flat element and the die-head to hold the die spaced away from the die-head in fixed relation thereto and to provide only restricted heat paths from the die to the die-head; the work-table being composed of a material of high heat and electrical conductivity; and means to electrically connect the high frequency heating apparatus to the die and the work-table, to heat the cutting edges of the die, to enable the die to seal the layers together and to cut through the materials adjacent the seal, in a single operation.

References Cited in the file of this patent

UNITED STATES PATENTS

| | | |
|---|---|---|
| 2,422,525 | Brown | June 17, 1947 |
| 2,638,963 | Frederick | May 19, 1953 |
| 2,706,165 | Korsgaard | Apr. 12, 1955 |
| 2,946,713 | Dusina | July 26, 1960 |
| 3,010,866 | Douchet | Nov. 28, 1961 |

FOREIGN PATENTS

| | | |
|---|---|---|
| 514,470 | Canada | July 12, 1955 |